United States Patent [19]
Yang

[11] Patent Number: 5,392,487
[45] Date of Patent: Feb. 28, 1995

[54] UNIVERSAL WINDSHIELD WIPER AND WIPER ARM CONNECTOR

[76] Inventor: Ming-Tung Yang, No. 4-3, Lane 97, Lung Chuen Street, Panchiao Taipei Hsien, Taiwan, Prov. of China

[21] Appl. No.: 166,942

[22] Filed: Dec. 15, 1993

[51] Int. Cl.⁶ .............................................. B60S 1/40
[52] U.S. Cl. ............................. 15/250.32; 15/250.42; 403/154; 403/161
[58] Field of Search ............ 15/250.32, 250.31, 250.35, 15/250.42, 250.33, 250.36; 403/326, 327, 329, 263, 154, 155, 161

[56] References Cited

U.S. PATENT DOCUMENTS

| | | | |
|---|---|---|---|
| 4,370,775 | 2/1983 | van den Berg et al. | 15/250.32 |
| 4,443,907 | 4/1984 | Chamberlain | 15/250.32 |
| 5,065,474 | 11/1991 | Charng | 403/154 |
| 5,084,933 | 2/1992 | Buechele | 15/250.32 |

FOREIGN PATENT DOCUMENTS

| | | | |
|---|---|---|---|
| 53960 | 6/1982 | European Pat. Off. | 15/250.32 |
| 2055560 | 3/1981 | United Kingdom | 15/250.32 |
| 2119637 | 11/1983 | United Kingdom | 15/250.32 |
| 2163042 | 2/1986 | United Kingdom | 15/250.32 |
| 2168243 | 6/1986 | United Kingdom | 15/250.32 |

OTHER PUBLICATIONS

Tridon packaging label from windshield wiper blade, Dated Nov. 15, 1991 via a fax transmission.

*Primary Examiner*—David A. Scherbel
*Assistant Examiner*—Gary K. Graham
*Attorney, Agent, or Firm*—Bacon & Thomas

[57] ABSTRACT

The invention relates to a windshield wiper connector structure, specifically such a structure that connects all types of automobile windshield wipers onto the powered windshield wiper arm by having the capability of supporting many varieties of different connection structures and thus attaining the innovative, practical and economical value that meets the psychological requirements of the majority of consumers.

2 Claims, 9 Drawing Sheets

UNIVERSAL WINDSHIELD WIPER AND WIPER ARM CONNECTOR

BACKGROUND OF THE INVENTION

A profuse range of automobile types and models can be seen these days and each different model has its own particular kind of windshield wiper structure. Furthermore, the windshield wiper arms equipped on each model of automobile are available in a wide variety of different structural installation specifications, such as wide and narrow stem-type wiper arms, hooked wiper arms, screw-on type wiper arms and large or small diameter insertion-type wiper arms, side-pin wiper arms and so on, and each type of windshield wiper arm has its own proper assembly connector. Therefore, when a windshield wiper needs to be changed, in addition to noticing the length and width, the type and specific variety of hook connector must be known before a new windshield wiper set can be installed. As a result, most windshield wipers are sold as a packaged assortment which includes five, six or even ten different types of hook connectors, such that after the consumer determines the proper length and makes the purchase, the consumer will be able to choose the most suitable hook connector for installation out of the wide range of types provided. However, this method of including different sets of hook connectors when only one set is required, although offering an effective means of practical installation, does not conform the principles of economy since the remaining sets are wasted because they cannot be utilized. This type of product also has higher production costs, a factor that influences its marketing competitiveness.

The objectives of the invention herein concern conventional windshield wiper products, specifically the shortcoming of windshield wiper products in the past having to include so many types of hooked connectors, and involves the research and development of a windshield wiper connector with a simplified installation structure which makes possible the providing of a single set of connectors that can be utilized on the hooked connectors on every type of windshield wiper, wherein each set of windshield wipers must only be packaged with one pair of connectors that can be effectively hooked to any type of windshield viper, thereby eliminating the conventional shortcomings stemming from the necessity of purchasing multiple sets and wasting all but the set needed for installation. Furthermore, the invention herein attains the objectives of reducing production cost and raising the profit value of new windshield wiper products, while also realizing a range of practical and convenient functions.

SUMMARY OF THE INVENTION

The invention herein is a windshield wiper connector structure, specifically referring to a structure that hooks an automobile windshield wiper onto the powered windshield wiper arm, which is injection molded as a single unit and consists of two side plates and a bridge plate assembly that are assembled together. The two side plates each have an identically spaced large hole and small hole and, along the upper edge of the side plate a flexibly active leaf spring and on the lower edge of the side plate is a two-section leaf spring below and situated in from of as wall as below and to the rear of the aforementioned leaf spring. Furthermore, the active surface of the upper leaf spring has a small circular hole and an elongated slot, while the lower front leaf spring and rear leaf spring both have a matching large hole and small hole with aligned upper diameters, which enables the hooking of various types of windshield wipers, whether wide or narrow windshield wiper arms, hooked windshield wiper arms, screw-on type windshield wiper arms, small or large diameter insertion-type windshield wiper arms and side-pin windshield wiper arms, thereby effectively bringing into play total functionality and unusual practicality by attaining the objective of providing a connector assembly that can be effectively utilized on all windshield wiper blades and windshield wiper hooked connectors, and this is among the innovative characteristics of the invention herein.

DETAILED DESCRIPTION OF THE PREFERRED EMBODIMENTS

Figure 1:
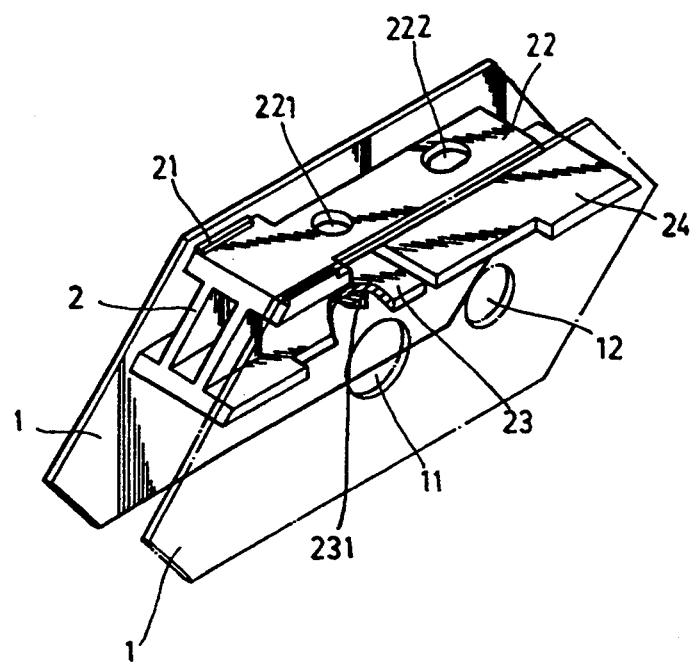
FIG. 1 is a drawing is a cross-sectional isometric drawing of the connector of the invention herein.
Figure 2:
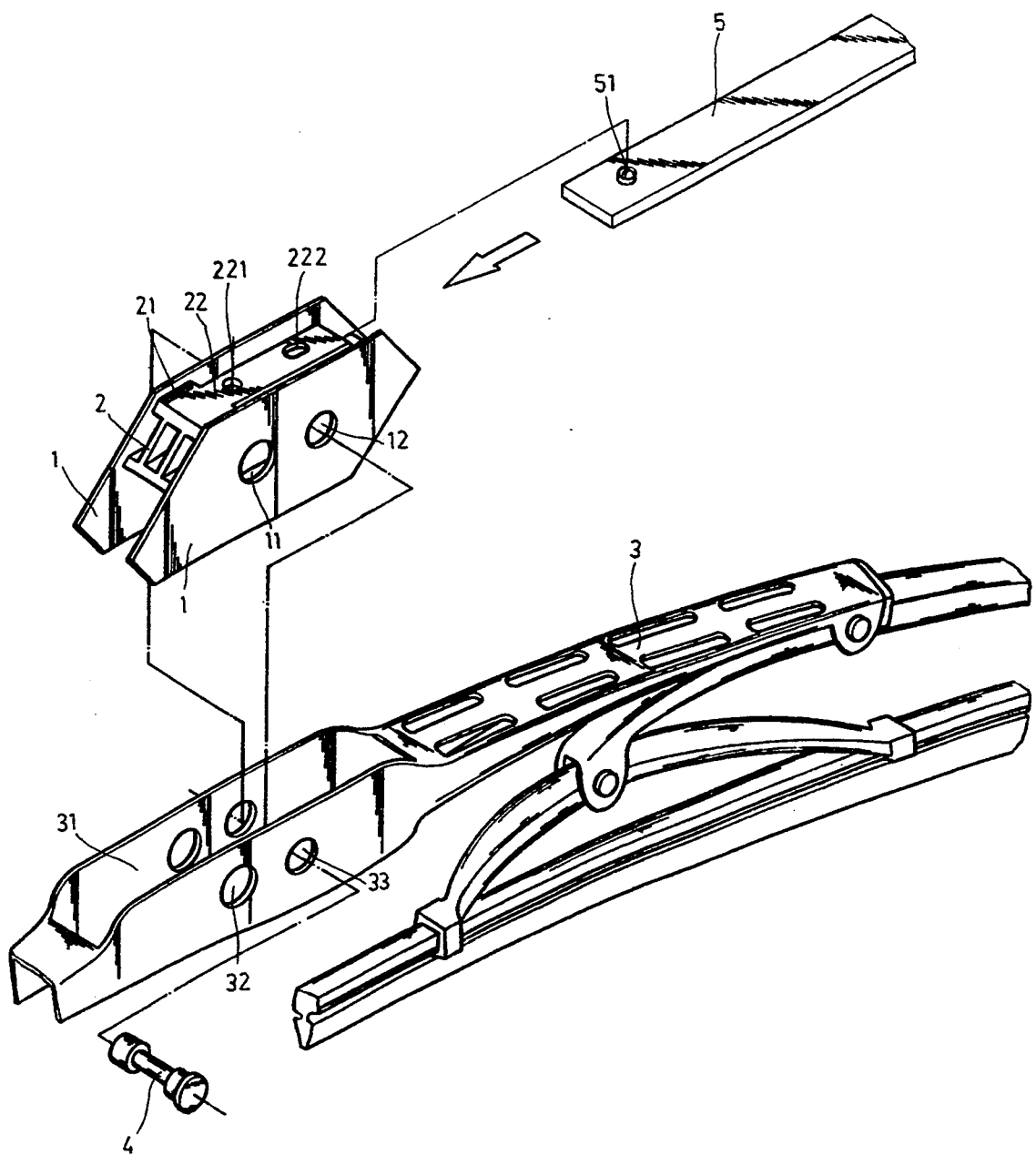
FIG. 2 is an exploded drawing of the insertion-type wiper arm of the invention herein.
Figure 3:
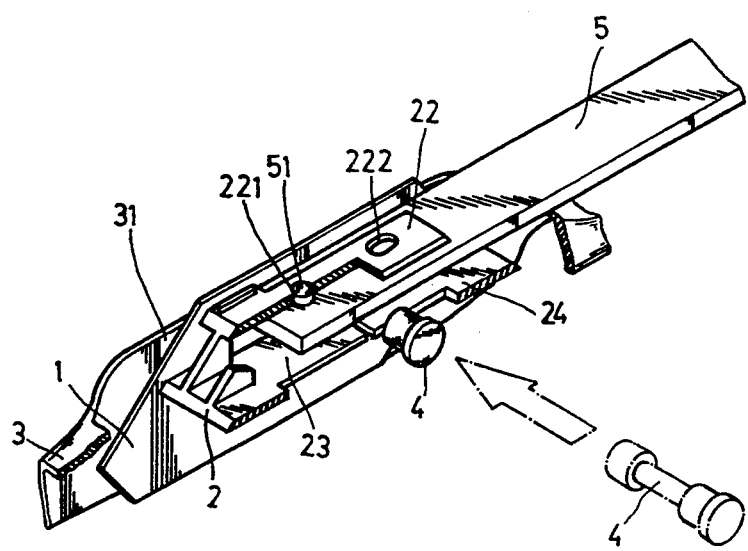
FIG. 3 is a perspective view, partially broken away of the insertion-type wiper arm assembly of the invention herein.
Figure 4:
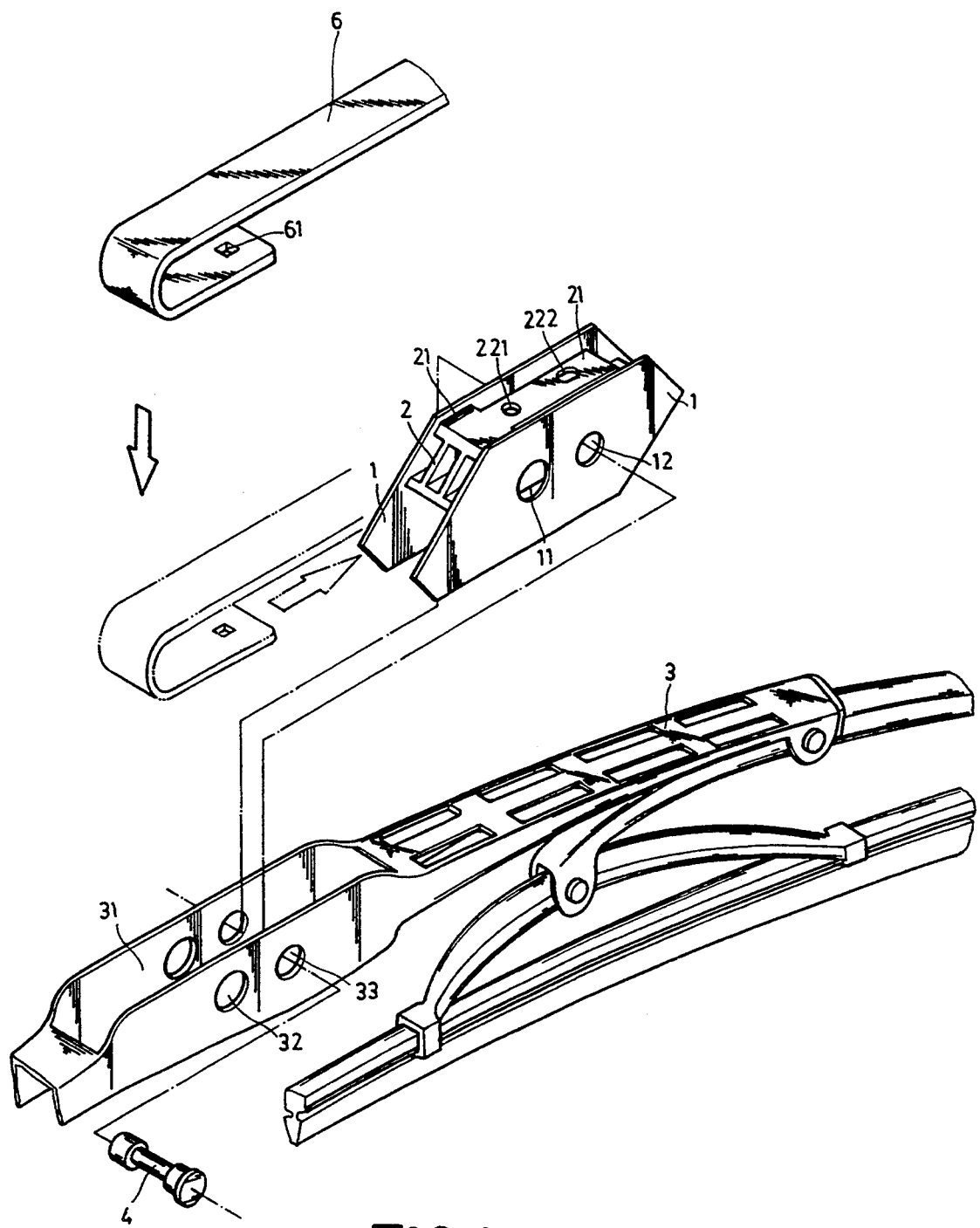
FIG. 4 is an exploded perspective drawing of the hooked wiper arm structure of the invention herein.
Figure 5:
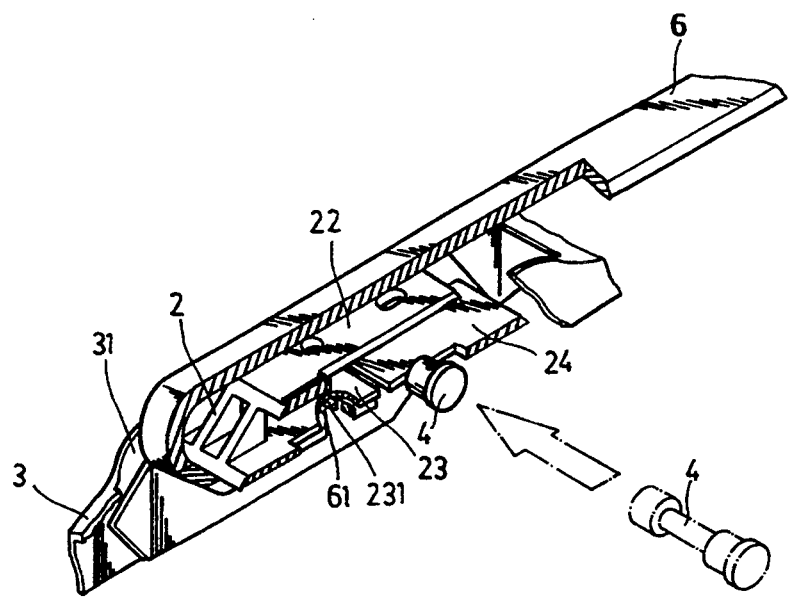
FIG. 5 is a perspective view, partially broken away of the hooked wiper arm assembly of the invention herein.
Figure 6:
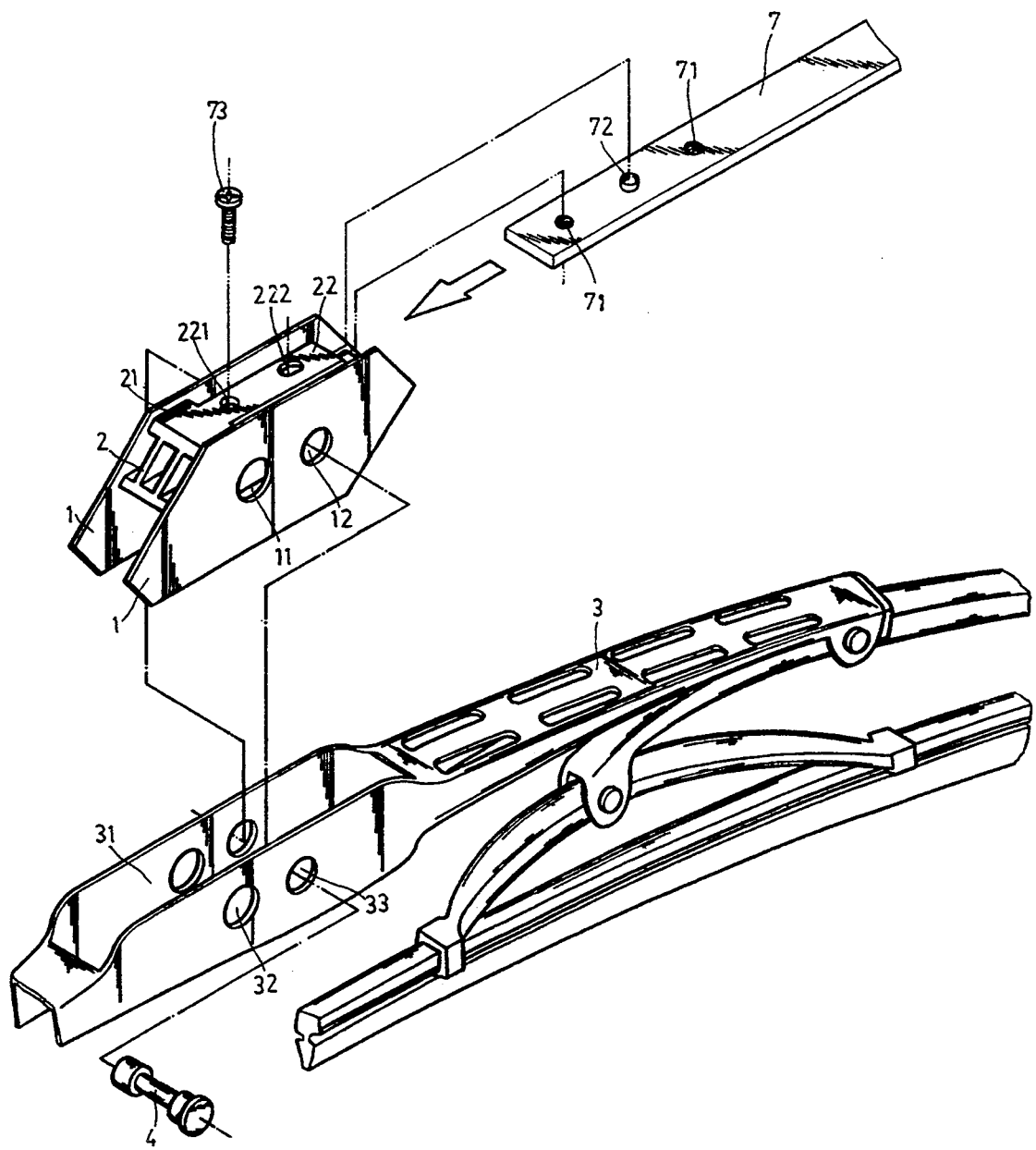
FIG. 6 is an exploded, perspective drawing of the screw-on type wiper arm structure of the invention herein.
Figure 7:
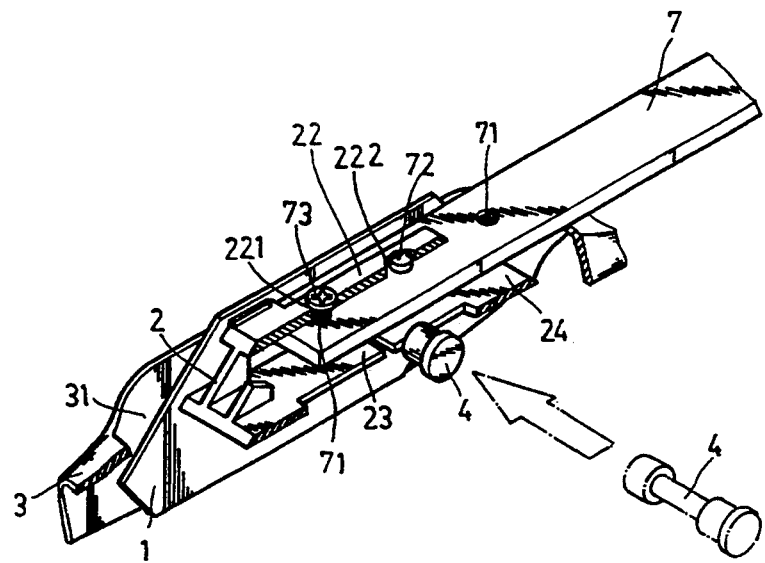
FIG. 7 is a perspective view, partially broken away of the screw-on type wiper arm assembly of the invention herein.
Figure 8:
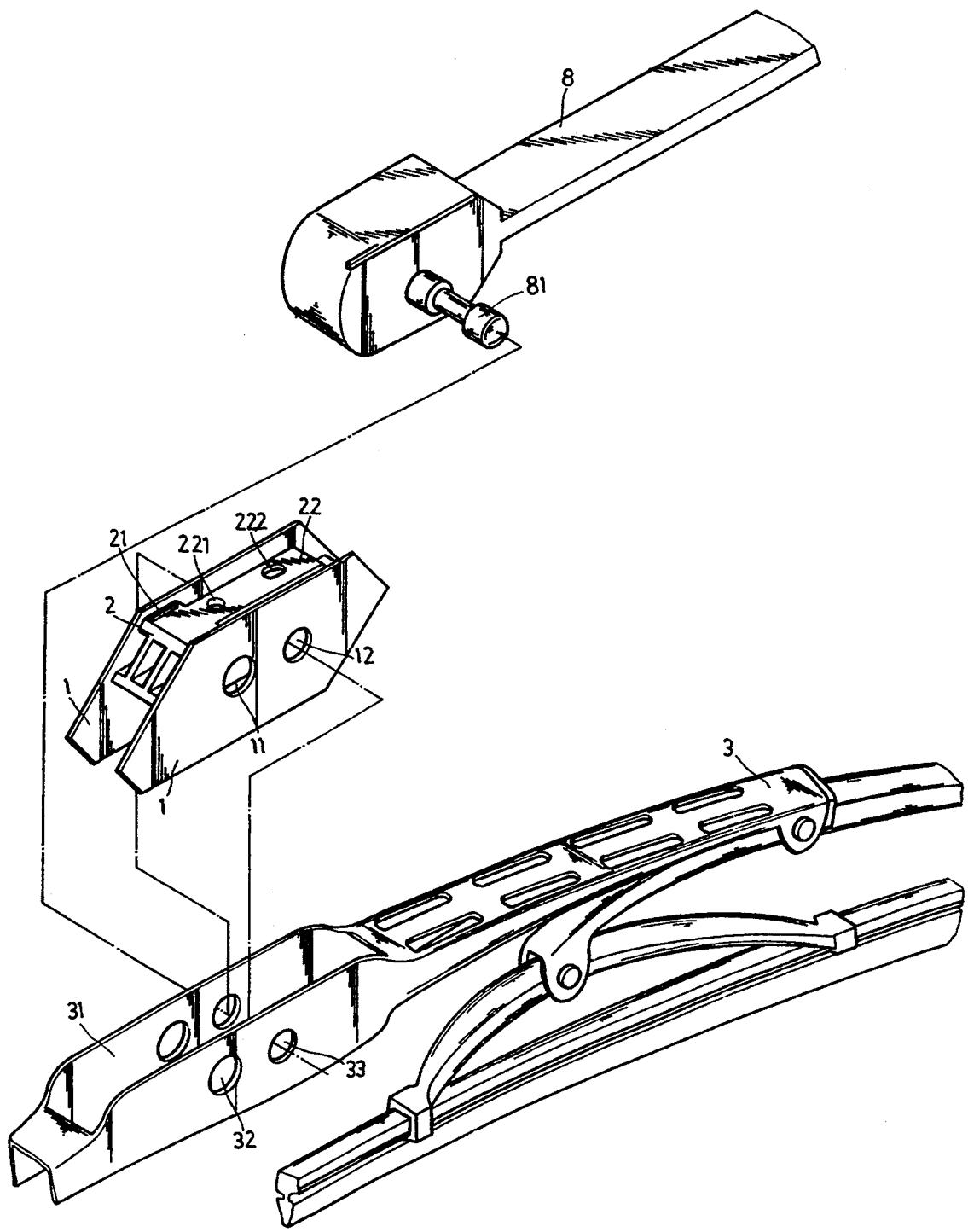
FIG. 8 is an exploded, perspective drawing of the side-pin wiper arm structure of the invention herein.
Figure 9:
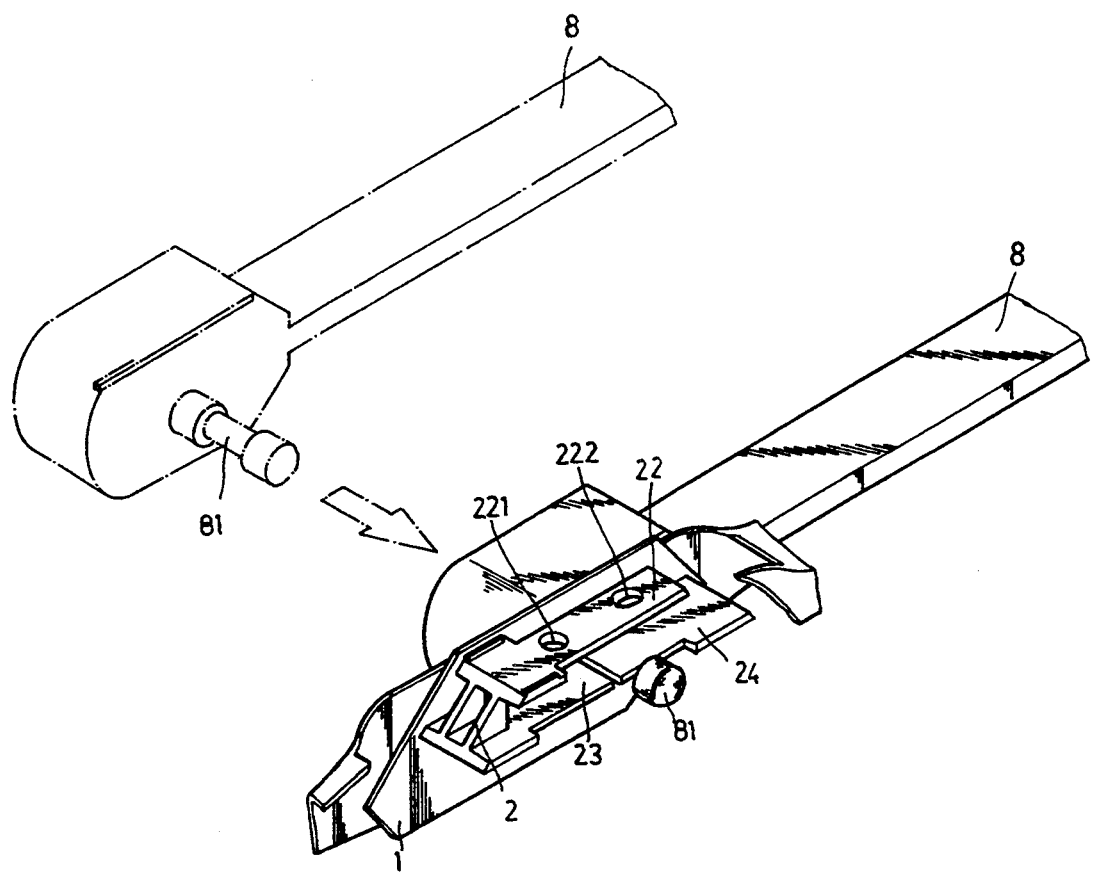
FIG. 9 is a perspective view, partially broken away of the side-pin wiper arm assembly of the invention herein.

As indicated FIG. 1 and FIG. 2, the invention herein consists of a windshield wiper connector structure, specifically of a kind that connects an automobile windshield wiper blade to a powered windshield wiper arm, which is injection molded as a single unit and consists of a two side plates (1) and bridge plate assembly (2) in between the aforesaid two side plates (1); there are no limitations as to the shape of the two side plates (1), except that the internal distance between two side plates (1) must accommodate the thickness of the bridge plate assembly (2) as well as match the width of the connector channel (31) centered on the windshield wiper framework (3); furthermore, there is a large hole (11) and a small hole (12) in alignment through both sides of the two side plates (1), and the large hole (11) and small hole (12) are spatially matched with the two insertion holes (32) and (33) through the connector channel (31), such that when the connector is inserted into the connector channel (31) of the windshield wiper framework (3), the large hole (11) can be exactly aligned with the insertion hole (32) and the small hole (12) can be exactly aligned with the insertion hole (33); the bridge plate assembly (2) is firmly secured in structural form between the two side plates (1), with the width of the bridge plate assembly (2) having the same dimensions of a typical wide-type powered windshield wiper arm, however, the fixed interval between the two side plates (1) must also be sufficient to accommodate the emplacement of guide strips (21), but the reduced interval remains of sufficient width to accommodate the insertion of a narrow-type powered windshield wiper arm; furthermore, positioned on the top edge of the bridge plate, assembly (2) at the front end and the rear end is an upper leaf spring (22) that is elastically active, while at the bottom edge of the bridge plate assembly (2) is a two-section type counterpart that is centrally divided into a lower front leaf spring (23) and a lower rear leaf spring (24), with the height between the top and bottom edges being approximately the same width as a plate-type powered windshield wiper; furthermore, machined through the side of the upper leaf spring (22) is small circular hole (221) and an elongated slot (222), and the specifications and interval of the small circular hole (221) and the elongated slot (222) match the positions of the protruding points and screw holes of the current powered windshield wiper arm to enable the protruding points and screw holes to interlock and be fastened together with screws; positioned on the bottom edge of the lower front leaf spring (23) are protruding conical tabs (231) that match the grooves in the hooked powered windshield wiper arms that facilitate secure interlocking though hooking; furthermore, the elastically active end points of both the lower front leaf spring (23) and the lower rear leaf spring (24) can enter at the diametric edges of the large hole (11) and the small hole (12) in the side plate (1), such that when the large hole (11) and the small hole (12) are penetrated by the pin (4), the grooves of the pin (4) are interlocked by the elastic action of the lower front leaf spring (23) and the lower rear leaf spring (24); as indicated in FIG. 2 and FIG. 3, when the connector of the invention herein is to be utilized for the connection of wide and narrow stem-type windshield wipers (stem-type powered windshield wiper arms) (5) with the connection structure of the windshield wiper framework (3), the pin (4) can be penetrated through the insertion holes (32) or (33) and the large hole (11) or the small hole (12) of the connector to enable the groove at the center portion of the pin (4) to be interlocked (when penetrated through the small hole (12) and the insertion hole (33)) by the elasticity of the lower rear leaf spring (24), such that the connector is secured into position within the connector channel (31) of the windshield wiper framework (3), and the stem-type windshield wiper (5) can be inserted into the elastically active bottom edge of the upper leaf spring (22) and the protruding point (51) of the wiper (5) is interlocked with the small circular hole (221), thereby completing the assembly of the wiper (5), the connector and the windshield wiper framework (3); however, when disassembling, the upper leaf spring (22) is disengaged to enable the small circular hole (221) to be removed from the protruding point (51) and allowing the stem-type windshield wiper (5) to be withdrawn, or the lower rear leaf spring (24) is disengaged to permit removal from the groove of the pin (4) and the withdrawal of the pin (4); when the connector of the invention herein is to be utilized for the connection of wide and narrow hooked windshield wipers (hook-type powered windshield wiper arms) (6) with the connection structure of the windshield wipe framework (3), as indicated in FIG. 4 and FIG. 5, the pin (4) is similarly inserted into the connector channel (31) and the open end of the hook bend of the hooked windshield wiper (6) is directly positioned around and onto the front edge of the bridge plate assembly (2) in between the two side plates (1), thereby enabling the top edge to be level with the upper leaf spring (22) and, furthermore, the divot (61) at the lower edge of the open curvature of the hood is interlocked with conical tab (231) at the bottom edge of the lower front leaf spring (23), and this thereby completes the assembly of the hooked windshield wiper arm (6), the connector and the windshield wiper framework (3), meanwhile, the guide strips (21) at the two sides of the bridge plate assembly (2) enable the hooking on of wide or narrow hooked windshield wiper arms (6); as for the removal procedure, the lower front leaf spring (23) is disengaged to enable the conical tab (231) to be removed from the divot (61), which thereby allows the hooked windshield wiper (6) to be withdrawn in the opposite direction; when the connector of the invention herein is utilized for the connection of wide or narrow screw-on type windshield wipers (screw-on type powered windshield wiper framework (7) with the windshield wiper arm (3), as indicated in FIG. 6 and FIG. 7, after the pin (4) insertion is completed, the forward end of the screw-on type windshield wiper arm (7) is inserted from the bottom end of the upper leaf spring (22), and since the upper side of the forward end has two screw holes (71) and a protruding point (72) (the screw holes (71) and the protruding point (72) are fabricated according to standard specifications), therefore, after insertion, the protruding point (72) is inserted into the elongated slot (222), while retaining a degree of forward and rearward movement, to enable the forward screw hole (71) (the rear screw hole is not utilized) to be aligned with the small circular hole (221) to provide a fastener (73) (screw) a means of tightening firmly, which completes the assembly of the screw-on type windshield wiper (7), the connector and the windshield wiper framework (3), furthermore, it is irrelevant whether a screw-on type windshield wiper (7) is wide or narrow because all sizes can be assembled; when disassembling, it is only necessary to unscrew the fastener (73) and disengage the upper leaf spring (22) to enable the elongated slot (22) to be removed from the protruding point (72) and thereby allow the screw-on type windshield wiper (7) to be detached; when the connector invention herein is utilized for the connection of side-pin windshield wipers (side-pin type powered windshield wiper arms) (8), as indicated in FIG. 8 and FIG. 9, since the side-pin windshield wiper (8) itself has a laterally mounted pin (81) and, furthermore, the pin (81) meet standard specifications for thick pins (large diameter) and thin pins (small diameter), therefore, the connector can be placed into the connector channel (31) of the windshield wiper framework (3), wherein the large hole (11) and the insertion hole (32) are exactly aligned with the small hole (12) and the insertion hole (33), respectively, then the pin (81) of the side-pin windshield wiper (8) is directly inserted into the insertion hole (32) and the large hole (11) (when the pin diameter is large) or into the insertion hole (33) and the small hole (12) (when the pin diameter is small) to enable the wiper to be interlocked onto the groove centered on the pin (81), and this completes the assembly procedure for assembling the side-pin windshield wiper (8), the connector and the windshield wiper framework (3); to disassemble, the lower front leaf spring (23) (when the pin is of large diameter) or the lower rear leaf spring (24) (when pin is of small diameter) is disengaged to enable the wiper to be removed from the groove of the pin (81) and thereby allow the side-pin windshield wiper (6) to be easily withdrawn; there is another kind of insertion pin windshield wiper with holes in the insertion pins and since its principles of assembly is related to the structural positioning, all such products are essentially the same as the side-pin windshield wiper (8), furthermore, the aforementioned variant does not have a pin and therefore the connector and the connector channel (31) can be assembled by utilizing the pin (4) or an additional long pin can be inserted into the insertion-pin windshield wiper; as a result, to avoid an overly excessive discussion, this type of windshield wiper has not been included in the detailed description and drawings of the invention herein, however, from the foregoing description it can be known that the windshield wiper connector of the invention herein can be utilized with wide or narrow stem-type windshield wipers (5), hooked windshield wipers (6), screw-on type windshield wipers (7), side-pin windshield wipers (8) and insertion-pin windshield wipers and so on, and with regard to currently available powered windshield wiper arms, the windshield wiper connector of the invention herein can be utilized comprehensively with all the aforementioned types since it provides for a stable and effective connection between the windshield wiper and the powered windshield wiper arm.

What is claimed is:

1. A universal connector for connecting a windshield wiper blade framework having a connector channel to a windshield wiper arm comprising:
   a) first and second side plates spaced such that they are adapted to fit within the connector channel, each side plate defining a first hole having a first diameter and a second hole having a second diameter such that the second diameter is less than the first diameter, the first and second side plates positioned such that the first holes are coaxially aligned with each other and the second holes are coaxially aligned with each other; and
   b) a bridge plate assembly extending between and connected to each of the first and second side plates, the bridge plate assembly having a top and bottom rear edge; and
   c) an upper leaf spring having a substantially circular opening and an elongated slot therein, said upper leaf spring is connected to and extends from said top rear edge of said bridge plate assembly;
   d) a front lower leaf spring spaced from the upper leaf spring, the front lower leaf spring having a lower surface and at least one protruding conical tab extending from the lower surface, the front lower leaf spring positioned such that at least a portion thereof extends across the first holes said front lower leaf spring is connected to and extends from said bottom rear edge of said bridge plate assembly; and
   e) a rear lower leaf spring spaced from the upper leaf spring and positioned such that at least a portion thereof extends across the second holes said rear lower leaf spring coupled between and to each of said side plates.

2. The universal connection of claim 1 wherein the said bridge plate assembly has an upper surface and further comprising a guide strip located on a portion of the upper surface adjacent to each side plate.

* * * * *